United States Patent Office 3,425,985
Patented Feb. 4, 1969

3,425,985
AMIDE COMPOSITIONS STABILIZED WITH ALKYLATED DIPHENYL AMINES
Helmut Freytag, Cologne-Stammheim, Ernst Reichold, Krefeld, Otto Bayer, Burscheid, Walter Bockmann, Krefeld-Uerdingen, and Joachim Wagner, Dormagen, Germany, assignors to Farbenfabriken Bayer Aktiengesellschaft Leverkusen, Germany, a corporation of Germany
No Drawing. Filed Apr. 18, 1966, Ser. No. 543,006
Claims priority, application Germany, Apr. 24, 1965, F 45,902
U.S. Cl. 260—45.9   3 Claims
Int. Cl. C08g 51/60, 41/02

ABSTRACT OF THE DISCLOSURE

A stabilized polyamide composition comprising a synthetic, high molecular weight polyamide and a minor amount of an organic amine of the formula

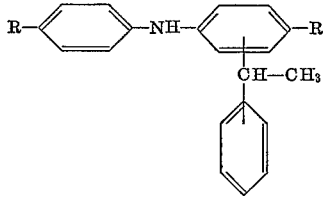

wherein R is a branched alkyl radical of 3–4 carbon atoms. A process for preparing the polyamide composition described above. This composition is particularly useful in stabilizing polyamides which are employed in the preparation of fibers against the degrading effects of oxygen and heat.

---

This invention relates to a high molecular polyamide composition stabilised against atmospheric degradation at elevated temperatures.

High molecular weight polyamides can be stabilised more particularly against the effects of heat and oxygen, by a number of compounds which are incorporated or worked into the polyamides in quantities of, generally, 0.1 to 5% by weight.

For example, it has already been proposed to stabilise polyamides with small quantities of N-aryl substituted polyamines. In addition, tertiary and aromatic amines have also been used as stabilisers. Water-insoluble diaryl ketone condensation products have been described as stabilisers against the action of hot water. Apart, however, from the fact that the stabilising effect of many of these amines is far from satisfactory, discolouration of the polyamide is a frequent occurrence.

We have now found that a polycaprolactam composition containing amino compounds as stabilizers against the effects of heat and oxygen shows hardly any discolouration. According to the present invention amino compounds corresponding to the formula

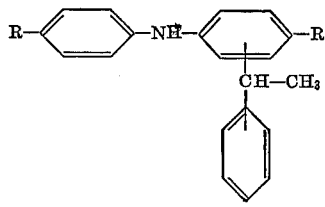

in which R is a branched alkyl radical with 3 or 4 carbon atoms, are used as the stabilisers.

These amino compounds are incorporated or worked into the polyamide in quantities from 0.05 to 10% by weight, and preferably in quantities of 0.1 to 5% by weight, in order to obtain the desired stabilising effect. The compounds used in accordance with the invention as stabilisers for polyamides, can be prepared in known manner by reacting diphenylamine with suitable isoolefins and styrene, for example by reacting diphenylamine with isobutylene and styrene. The polyamides stabilised with these amines, in particular polycaprolactams of high molecular weight, are particularly suitable for the production of shaped bodies, for example moulding and fibre products.

The stabilized polyamides are synthetic linear polyamides having molecular weights of 10,000 and higher, especially suitable for fibre formation. The most common polyamides are polycaprolatcam and polyhexamethylenediamine adipate, but other polyamides are also useful for stabilizing.

The stabilisers used in accordance with the invention may be incorporated or worked into the polyamide by tumbling the completed polyamide granulate with the stabiliser, and homogenising the resulting mixture by means of an extruder. If desired, the melt thus obtained may be directly injection-moulded, or further processed into a fibre-liked material. Alternatively, the melt containing the stabiliser may be re-drawn in filament form into a water bath, chopped up again into granules and then dried. Another method of working the stabiliser into the polyamide melt comprises adding the stabiliser at a given time, before, during or after polymerisation.

Where a continuous-cycle polymerisation plant is available, the stabiliser may even be added directly before the finished polyamide is spun off.

The preparation of the stabiliser preferably used in accordance with the invention is described in the following example:

An autoclave is filled with 506 g. (3 mols) of diphenylamine and 50 g. of acid fuller's earth (Tonsil k10), and is then heated to 270° C. over a period of 75 minutes, after 325 cc. of isobutylene have been pumped into it. When the reaction temperature has been reached, fresh isobutylene is pumped in over a period of 2 hours until a total of 561 g. (10 mols) of isobutylene is present. The autoclave is kept at 270° C. for another 3 hours and, after cooling to 190° C., 156 g. (1.5 mols) of styrene are pumped in over a period of 30 minutes. The autoclave is kept at 190° C. for 1½ hours and, after cooling to approximately 80° C., the acid fuller's earth is removed from the mixture by means of a pressure-type suction filter. Yield: 1095 g. of an amber-coloured viscous liquid.

Analysis for

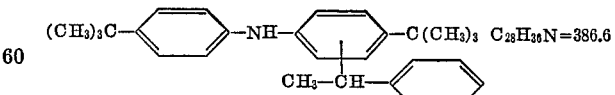

Calculated: C, 85.7, H, 9.71, N, 4.54. Found: C, 86.05, H, 9.82, N, 4.50.

The following examples illustrate the invention more particularly.

Example 1

0.5 part of an amine corresponding to the formula

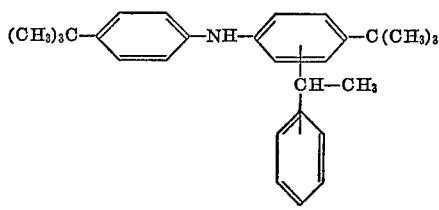

are added to 100 parts of polycaprolactam with a relative viscosity of 3.0 to 3.1 (measured at 25° C. on a 1% solution in m-cresol), which had been polymerised, extracted and dried as known per se. The amine is tumble-mixed with the granulate and homogeneously incorporated by means of an extruder. The resulting melt is drawn into a 2.5 mm.-thick filament in a water bath, chopped up into granules and dried. The chips of polycaprolactam containing the stabiliser are spun in known manner into rayon of 840/140 den. and then stretched. The resulting rayon has normal tensile strengths of approximately 8 g./den. at a breaking elongation of 16.5% is almost white in colour and only darkened to a limited extent, even on exposure to light.

In order to test the dimensional stability of the filaments under heat, they were exposed to a temperature of 145° C. under a load of 3.7 g./den. until they failed. The time interval up to failure is then measured. For comparison, other filaments were tested, some without stabilisers and some containing known heat stabilisers. Compared with the known diphenylamine stabilisers, the stabiliser according to the invention exhibits far superior thermal stability and colour stability. Compared with stabilisers based on substituted p-phenylene diamines, the polyamides provided with the stabilisers according to the invention exhibit considerably better colour stability (Table 1).

Table 1 is a comparison between the stabilisers according to the invention and some known stabilisers. In each case, the polyamide contains the stabilisers in a quantitty of 0.5% by weight.

Example 2

Table 2 illustrates the effect of atmospheric oxygen at elevated temperature on fairly thick-walled polycaprolactam mouldings in the presence of stabilisers, in comparison with a non-stabilised polyamide and with a polycaprolactam provided with an amine corresponding to the formula

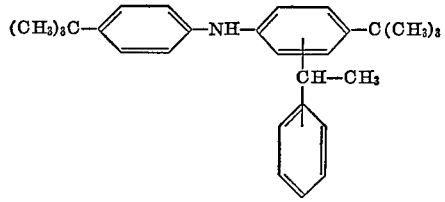

For this purpose, the stabilisers were each incorporated into the polycaprolactam in quantities of 0.5%, as described above. Filaments 2.5 mm.-thick to 3 mm.-thick were prepared by spinning the melt into a water bath and were then chopped up into granules and dried. The granulate is then exposed to atmospheric oxygen at 150° C., and its relative viscosity is measured at the beginning of the test, after 144 hours, 500 hours and 1000 hours, respectively. The result is given in Table 2 as the percentage decrease in the relative viscosity after 100 hours alongside the other relative viscosity data. The relative solution viscosity is measured on a 1% by weight solution in m-cresol at 25° C.

TABLE 2

| Stabiliser Chemical composition | Relative viscosity of the starting material | Relative viscosity of the material following heat treatment at 150° C., after— | | | Percentage decrease in the relative viscosity after 1,000 hours |
| --- | --- | --- | --- | --- | --- |
| | | 144 hrs. | 500 hrs. | 1,000 hrs. | |
| None | 3.11 | 2.82 | 2.63 | 2.25 | 27.5 |
| Stabiliser according to invention | 3.19 | 3.64 | 2.91 | 2.85 | 10.6 |
| 2-mercaptobenzimidazole | 2.77 | 2.96 | 2.33 | 2.02 | 27.2 |
| Di-β-naphthyl-p-phenylene diamine | 2.77 | 2.98 | 2.58 | 2.23 | 19.5 |
| N-phenyl-N-cyclohexyl-p-phenylene diamine | 3.10 | 3.03 | 2.95 | 2.50 | 19.5 |
| N-phenyl-N-isopropyl-p-phenylene diamine | 3.17 | 3.37 | 2.94 | 2.69 | 15.2 |

Example 3

Polycaprolactam with a relative viscosity of 3.0 to 3.1 which, following size-reduction, was separated from the monomeric components by extraction with water and then dried, is intimately mixed in a melt extruder with 0.5% by weight of the stabiliser according to the invention as used in Example 1 and the resulting mixture is chopped up. The chips, mixed with the stabiliser, are spun in known manner into a rayon of 840/140 den. and then stretched. The resulting rayon has a normal ultimate tensile strength of approximately 8 g./den. and a breaking elongation of 16.5% is almost white in colour and only darkens to a limited extent on exposure to light.

TABLE 1

| Stabiliser chemical composition | Colour of the rayon | Change in the colour of the rayon on exposure to light | Thermal stability test at 145° C., duration in hours |
| --- | --- | --- | --- |
| None | White | None | 2.0-2.5 |
| Stabiliser according to the invention | Almost white | Slight | 26.7 |
| Diphenylamine treated with styrene according to German Pat. 895,973 | Pale yellow | Deep blue | 9.3 |
| 4,4'-diisooctyl diphenylamine acc. to U.S. Patent 2,530,769 | Light grey | Brownish | 12.1 |
| 2-mercaptobenzimidazole | White | None | 6.3 |
| Di-β-naphthyl-p-phenylene diamine | Pale brown | Brown | 29.8 |
| N-phenyl-N'-cyclohexyl-p-phenylene diamine | do | Dark brown | 31.4 |
| N-phenyl-N'-isopropyl-p-phenylene diamine | do | do | 31.9 |

To test the dimensional stability of the filaments under heat, they were exposed to a temperature of 145° C. under a load of 2.7 g./den. until they failed. The time interval before failure is then measured. For comparison, other filaments were tested, some without stabilisers and some containing known heat stabilisers.

The following table shows that, compared with stabilisers based on the same class of compounds, the stabiliser according to the invention exhibits far superior thermostability and colour stability and, compared with stabilisers based on substituted p-phenylene diamine, far superior colour stability and, above all, only limited discolouration.

TABLE 3

| Stabiliser | Colour of the rayon | Change in colour on exposure to light | Thermal stability test at 145° C., duration in hours |
|---|---|---|---|
| None | White | None | 2.0–2.5 |
| Stabiliser according to the invention | Almost white | Slight | 26.7 |
| Diphenylamine treated with styrene according to German Patent 895,973. | Pale yellow | Deep blue | 9.3 |
| 4,4'-diisooctyl diphenylamine according to U.S. Patent 2,530,769. | Pale grey | Brownish | 12.1 |
| 2-mercaptobenzimidazole | White | None | 6.3 |
| Di-β-naphthyl-p-phenylene diamine | Pale brown | Brown | 29.8 |
| N-phenyl-N'-cyclohexyl-p-phenylene diamine. | do | Dark brown | 31.4 |
| N-phenyl-N'-isopropyl-p-phenylene diamine. | do | do | 31.9 |

What we claim is:

1. A stabilized polyamide composition comprising a synthetic, fiber-forming polyamide having a molecular weight of at least 10,000 and a stabilizing amount of an aromatic amine of the formula

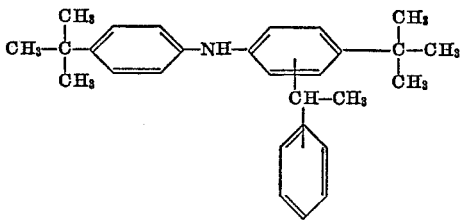

2. A stabilized polyamide composition according to claim 1, wherein the polyamide is poly-ε-caprolactam.

3. A stabilized polyamide composition according to claim 1, wherein the polyamide contains 0.05 to 10% by weight—calculated on the polyamide composition—of the aromatic amine.

References Cited

UNITED STATES PATENTS

| 2,530,769 | 1/1950 | Hollis | 260—45.9 |
| 3,003,995 | 10/1961 | Schule | 260—45.9 |
| 3,349,110 | 10/1967 | Cyba | 260—45.9 |

DONALD E. CZAJA, *Primary Examiner.*

H. E. TAYLOR, Jr., *Assistant Examiner.*

U.S. Cl. X.R.

260—570; 252—401